Oct. 11, 1960 W. ENGI 2,955,768
COFFEE GRINDER

Filed March 11, 1959 3 Sheets-Sheet 1

INVENTOR.
WALTER ENGI
BY
*Hermann E. Rachenbach*
ATTORNEY

Oct. 11, 1960 W. ENGI 2,955,768
COFFEE GRINDER
Filed March 11, 1959 3 Sheets-Sheet 2

INVENTOR.
WALTER ENGI
BY
Howard E Dackenbach
ATTORNEY

Oct. 11, 1960 W. ENGI 2,955,768
COFFEE GRINDER
Filed March 11, 1959 3 Sheets-Sheet 3
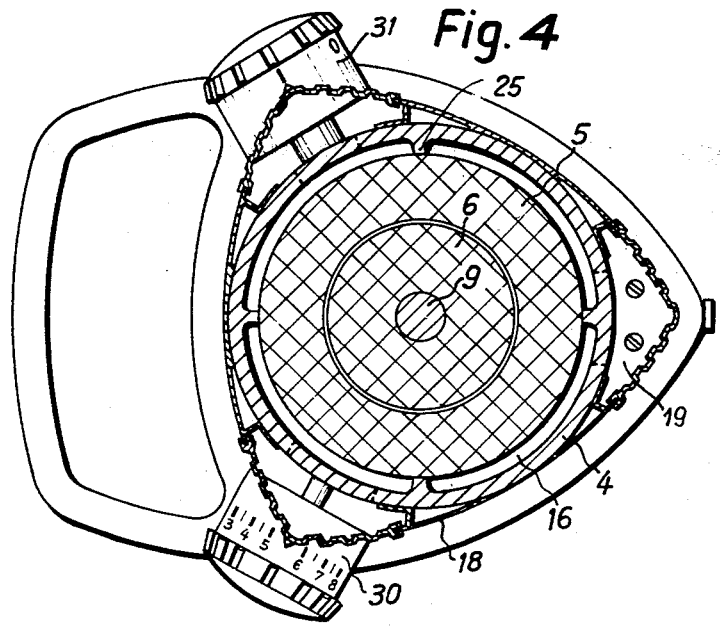
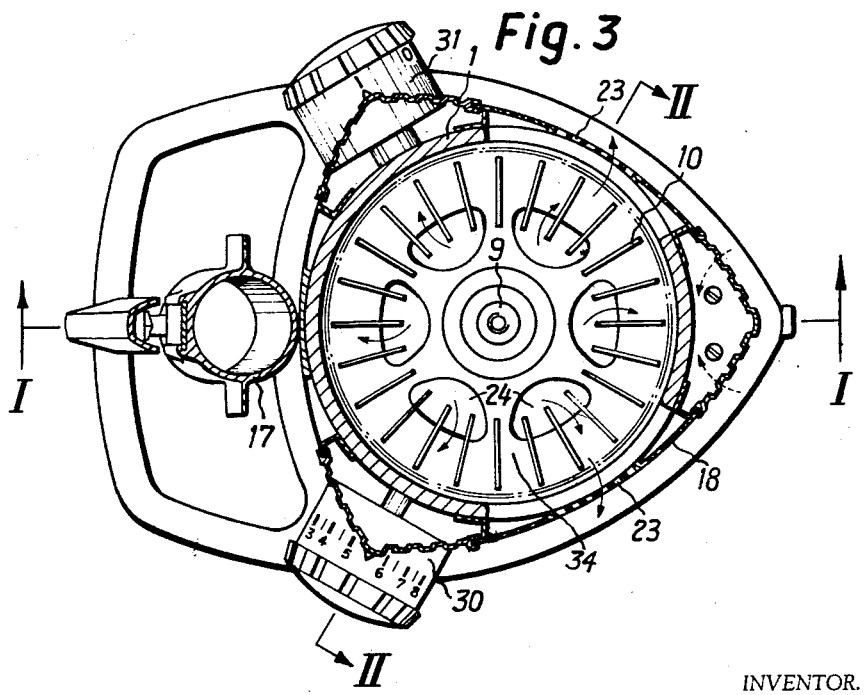
INVENTOR.
WALTER ENGI
BY
ATTORNEY United States Patent Office 2,955,768
Patented Oct. 11, 1960

2,955,768

COFFEE GRINDER

Walter Engi, Zurich, Switzerland, assignor to Adolf Ditting, Zurich, Switzerland Filed Mar. 11, 1959, Ser. No. 798,664

Claims priority, application Switzerland Mar. 14, 1958

3 Claims. (Cl. 241—66)

This invention relates to motor driven coffee grinders and more particularly to the cooling system of coffee grinders with a rotating and a fixed grinding disc and a longitudinal motor axle.

A considerable amount of heat is developed when coffee is ground. This amount of heat is dependant on the fineness desired, the grinding speed, the length of operation and the details of the design of the machine. At the beginning of the grinding process, the heat developed can be relatively easily absorbed by the grinding wheels themselves, when however the process is of longer duration, this effect is insufficient and a good and efficient cooling system is indispensable.

A heating of the coffee during the grinding process is a disadvantage because it then is in a certain sense roasted again and this causes a change in taste. A greater disadvantage is that warm coffee strongly attracts atmospheric moisture. This is a well known cause of the culinary deterioration of the ground coffee. For this reason the cooling system of such grinders is of special importance.

A first object of the invention is to provide means so that the heat generated during the grinding process is conducted away rapidly, so that the ground coffee is only slightly warmed and no change in taste occurs.

Another object of the invention is to provide means for an efficient cooling of the grinder and especially the grinding discs, so that the mill is suitable for continuous operation.

A further object of the invention is to provide means for cooling the driving motor by the same air current.

It is a further object of the invention to provide a cooling system which is not complicated and which permits an esthetic and pleasing external form.

These and other objects of the invention will become further apparent from the following detailed description, reference being made to the accompanying drawings, showing a preferred embodiment of the invention.

In the drawings:

Fig. 3 is a horizontal cross-section through the coffee grinder taken on the line III—III in Fig. 1;

Fig. 4 is a horizontal cross-section through the coffee grinder taken on the line IV—IV in Fig. 1.

Figure 1:
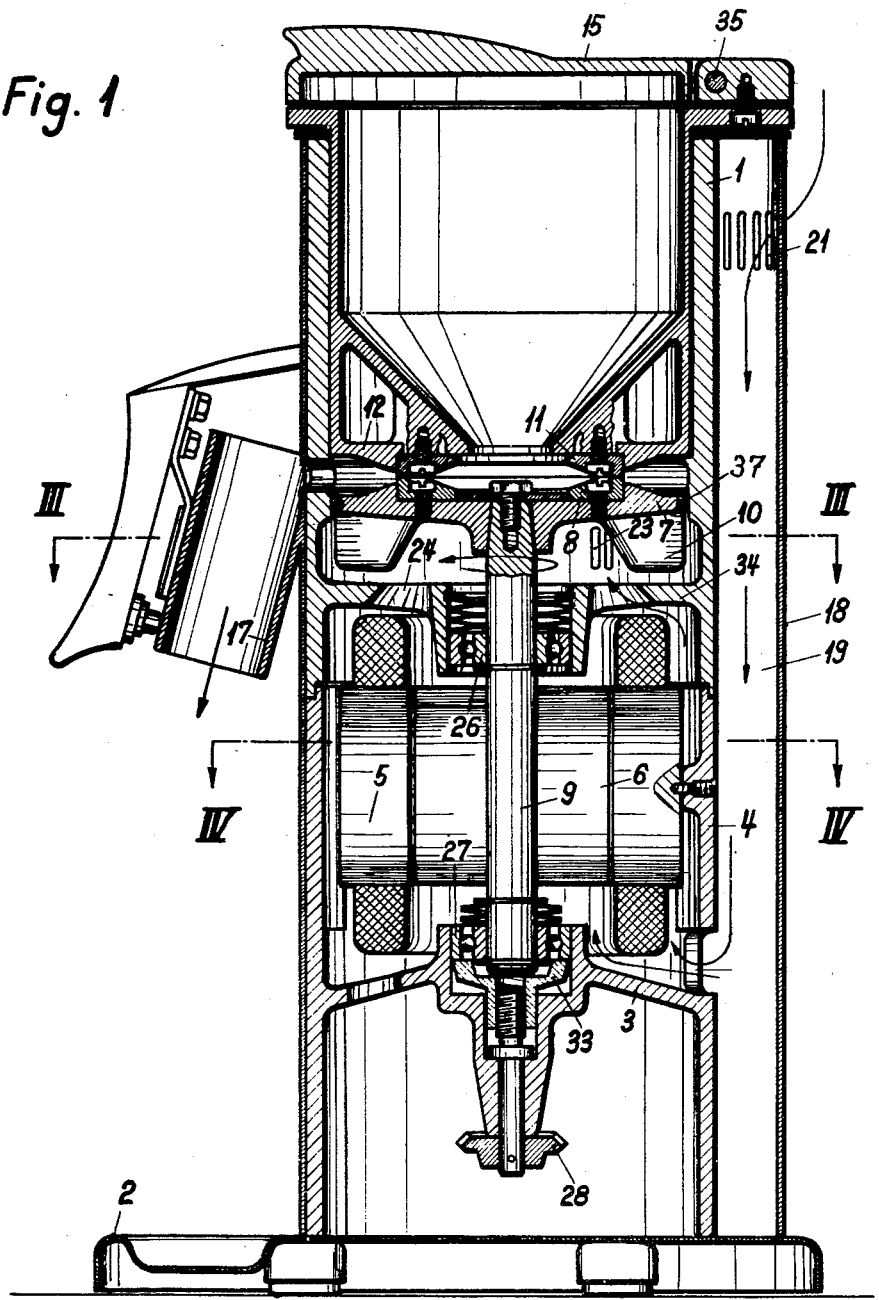
Fig. 1 is a longitudinal cross-section through a coffee mill taken on the line I—I of Fig 3.
Figure 2:
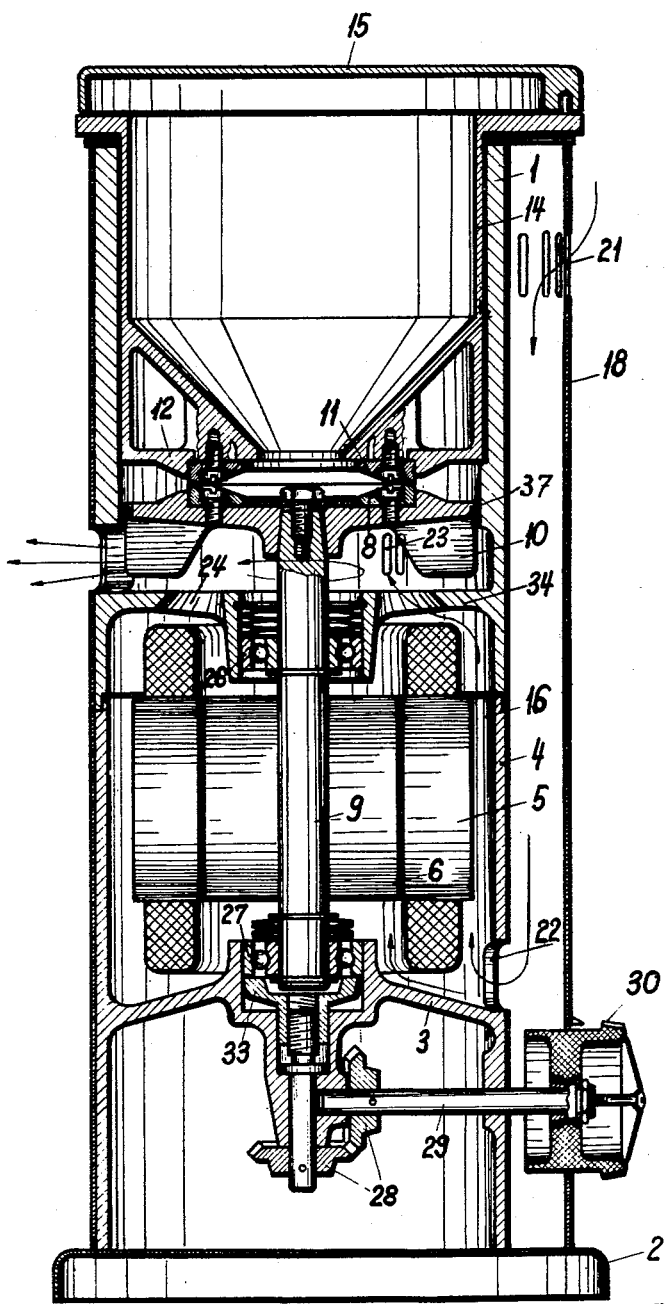
Fig. 2 is a vertical cross-section through the coffee mill taken on the line II—II of Fig. 3.

The grinder or mill which is designed for the grinding of coffee, possesses a housing or casing 1 of a thermally conductive material, for example aluminum, copper or brass, the thickness of the wall being about ¼ inch. This casing 1 is fixed to a base 2 and is divided approximately in the middle in two parts. Distanced from the base 2 is a bearing plate 3 in this casing in which the bearing 27 of the rotor is fitted. Between the stator 5 of the driving motor and the casing 1 air channels or spaces 16 are formed by a ridged part of the casing.

The stator 5 of the driving motor is centered by vertical ribs 25 of the casing 1.

The bearing flange 34, which forms a part of the upper part of the casing 1 extends inwardly and comprises a plurality of openings 24.

In this flange 34 are fitted the ball bearing 26 and springs. A rotating grinding disc 8 is fixed to the longitudinal axle 9 by means of a bearing plate 7 whereby the axle 9 is fixed rigidly with the rotor 6 of the driving motor and is carried in the ball bearings 26 and 27. The rotating wheel member 7 has a ring like sealing member 37 and is equipped with a plurality of impeller blades or fins 10 and forms a ventilator wheel.

The fins 10 carried on the wheel member 7 are spaced circumferentially.

Above and directly opposite the rotating grinding disc 8 is a stationary grinding disc 11 fixed to an insert piece 12. This insert piece 12 is formed on one side as a funnel 13 and has above this funnel a cylindrical wall part 14. The external diameter of this wall part 14 corresponds to the inside diameter of the housing 1. The funnel 13 and the cylindrical wall part 14 are formed as a single cast piece, which can be lifted up out of the casing 1, by which means the grinding discs 8 and 11 are accessible. This cast piece is closed by a cover 15 which can be turned about a bolt 35.

The distance between the two grinding discs 8 and 11, which are superimposed on each other, and thereby the desired fineness of the grind, can be adjusted. This adjustment is carried out by turning the handwheel 30, which is connected with the bevelled gear wheels 28 by means of the shaft 29. The shaft which is fixedly connected with the gear wheel 28 has on its upper end a threaded portion engaging the bearing piece 33. The bearing piece 33 has a square cross-section so that it can be axially moved but not turned. The axial displacement of the bearing piece 33 is transferred over the ball bearing 26 to the axle 9 and the grinding disc 8.

The grind comes out through the opening 36 and passing through the exit pipe 17 reaches a paper bag or container (not shown in the drawing) specially placed for this purpose.

With the hand wheee 31 which is connected to the switch 32 the motor can be turned on and off.

The casing 1 is covered outside with a metal sheet 18, which is partly spaced from it so that longitudinal air channels 19 are formed. The covering sheets 18 form in cross-section a practically triangular shape so that three air channels 19 are formed in which the cooling air can circulate. Instead of a triangular form another shape could have been chosen, especially oval or polygonal forms, by which care must be taken that the channels which divide the cooling air into individual currents possess the largest possible surface expose to the surface of the cooling housing 1. Holes 21 are provided at the supper edge of the covering sheets 18 through which the cooling air flows in in the direction of the arrows in Fig. 1. Near or slightly below the driving motor and above the bearing plate 3 are openings 22 in the casing 1 through which the cooling air is turned and flows into the clearance or spaces 16 between the stator 5 and the casing 1. The cooling air passes upwards through the openings 24 and reaches there by the ventilator 10, cools this and is radially blown through the exit holes 23 in the casing 1 and which are placed at about the height of the ventilator.

As a consequence of the good heat conduction between the cast insert consisting of the parts 12, 13 and 14 and the casing 1, the heat generated in the fixed grinding disc 11 is transmitted rapidly to the entire casing which is then cooled efficiently by the cooling air. By this means both the grinding disc 8 and 11 can be well cooled and also the heat generated in the driving motor is carried away.

The ventilator 10 is formed so that the cooling air moves in the direction of the arrows.

Various changes and modifications may be made without departing from the spirit and scope of the present invention and it is intended that such obvious changes and modifications be embraced by the annexed claims.

Having thus described the invention what is claimed as new and desired to be secured by Letters Patent is:

1. A coffee grinder comprising a stationary housing of material with good thermal conductivity, covering member surrounding said housing and being spaced from said housing, a pair of horizontal grinding discs superimposed upon each other, an electric motor with a rotor and a stator inside of said housing, a rotatable axle fixedly connected with said rotor and arranged longitudinally in said housing, the upper of said grinding discs being stationary and means for connecting the lower grinding disc to said axle for rotating said lower disc relative to said upper disc, ventilator wheel means connected with said axle below said rotatable grinding disc, longitudinally extending air channels between said housing and said stator openings in said housing near the lower end of said stator communicating with said air channels and the space between said housing and said covering member, further openings in said housing and said covering member substantially in the height of said ventilator wheel means, whereby the ventilator wheel means generate a cooling air current through said space between said housing and said covering member, said clearance and said further openings.

2. A coffee grinder according to claim 1, comprising a hopper with a central filling opening and with a cylindrical and a conical part, the hopper being exchangeably fixed to the upper part of the housing the cylindrical part being in thermal conductive connection with said housing and the lower part of said hopper supporting the stationary upper grinding disc.

3. A coffee grinder according to claim 1, whereby a plurality of longitudinal ribs are arranged between said housing and said stator, providing said air channels.

References Cited in the file of this patent

UNITED STATES PATENTS

| | | |
|---|---|---|
| 2,609,993 | Planiol | Sept. 9, 1952 |
| 2,838,247 | Hauser | June 10, 1958 |